United States Patent [19]
Chadha et al.

[11] Patent Number: 5,635,110
[45] Date of Patent: Jun. 3, 1997

[54] SPECIALIZED PHOSPHORS PREPARED BY A MULTI-STAGE GRINDING AND FIRING SEQUENCE

[75] Inventors: Surjit S. Chadha; Charles M. Watkins, both of Meridian, Id.

[73] Assignee: Micron Display Technology, Inc., Boise, Id.

[21] Appl. No.: 548,088

[22] Filed: Oct. 25, 1995

[51] Int. Cl.$^6$ .......................... C09K 11/54; C09K 11/00
[52] U.S. Cl. .................. 252/301.4 R; 252/301.6 R; 313/467; 313/468; 313/503; 427/64
[58] Field of Search .................. 313/467, 468, 313/503; 252/301.4 R, 301.6 R; 427/64

[56] References Cited

U.S. PATENT DOCUMENTS

| | | | |
|---|---|---|---|
| 3,635,833 | 1/1972 | Datta | 252/301.4 R |
| 3,723,339 | 3/1973 | Wanmaker et al. | 252/301.4 R |
| 4,119,562 | 10/1978 | Kagami et al. | 252/301.6 S |
| 4,275,333 | 6/1981 | Kagami et al. | 252/301.4 R |
| 4,894,583 | 1/1990 | Berkstresser et al. | 313/468 |
| 4,924,139 | 5/1990 | Morita et al. | 313/468 |
| 4,925,593 | 5/1990 | Borchardt et al. | 252/301.6 S |
| 5,115,306 | 5/1992 | Tsuda et al. | 358/60 |
| 5,185,553 | 2/1993 | Yang et al. | 313/468 |
| 5,229,331 | 7/1993 | Doan et al. | 437/228 |
| 5,232,549 | 8/1993 | Cathey et al. | 456/633 |

OTHER PUBLICATIONS

Dharmadhikari, D. M., et al., Abstract: "Structural Study of $ZnY_2O_4$", Indian J. Phys. 53A, 459–460 (1979). No Month.

*Primary Examiner*—Melissa Bonner
*Attorney, Agent, or Firm*—Rodney F. Brown

[57] ABSTRACT

A multi-stage process for preparing a phosphor product includes the stages of selecting precursors of a dopant and a host lattice as the phosphor starting materials, grinding the starting materials in an initial grinding stage for an initial grinding time period to produce an initial ground material having a smaller particle size distribution than the starting materials, firing the initial ground material in an initial firing stage at an initial firing temperature for an initial firing time period to produce an initial fired material, grinding the initial fired material in an intermediate grinding stage for an intermediate grinding time period to produce an intermediate ground material having a smaller particle size than the initial fired material, wherein the intermediate grinding time period is substantially less than the initial grinding time period, firing the intermediate ground material in an intermediate firing stage at an intermediate firing temperature for an intermediate firing time to produce an intermediate fired material, wherein the intermediate firing temperature is substantially greater than the initial firing temperature, grinding the intermediate fired material in a final grinding stage for a final grinding time period to produce a final ground material having a smaller particle size than the intermediate fired material, and firing the final ground material in a final firing stage at a final firing temperature for a final firing time to produce a phosphor product, wherein the final firing time is substantially less than the intermediate firing time.

34 Claims, 1 Drawing Sheet

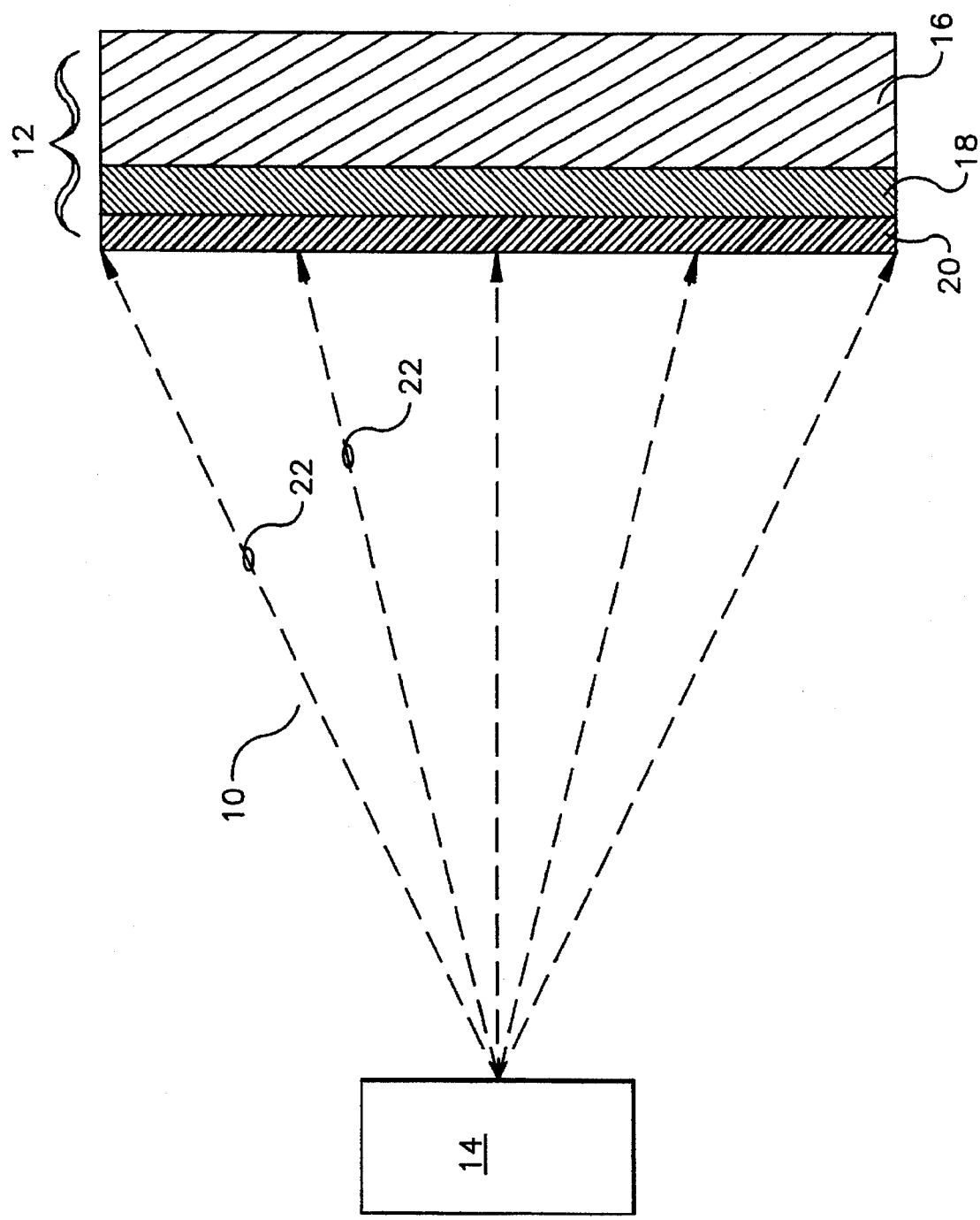

5,635,110

SPECIALIZED PHOSPHORS PREPARED BY A MULTI-STAGE GRINDING AND FIRING SEQUENCE

This invention was made with government support under Contract No. DABT63-93-C-0025 awarded by Advanced Research Projects Agency (ARPA). The Government has certain rights in this invention.

TECHNICAL FIELD

The present invention relates generally to the manufacture of phosphors having utility in luminescent display devices, and more particularly to the manufacture of phosphors having specialized performance characteristics by a specific multi-stage sequence of grinding and firing the materials of the phosphor.

BACKGROUND OF THE INVENTION

Luminescent materials, termed phosphors, have general utility in a broad range of lighting and display applications. A phenomenon common to all such applications is excitation of the phosphors in accordance with any one of a number of excitation techniques known in the art, causing the phosphors to emit light. Known excitation techniques include exposing the phosphors to various external energy sources. The excitation means can be electrons, ultra violet, x-rays, or gamma rays, to name a few. This excitation phenomenon is apparent in virtually all types of conventional, phosphor-containing, host lighting or display fixtures. Among such conventional fixtures are fluorescent tubes, cathode ray tubes, gas discharge plasma displays, vacuum fluorescent displays, and field emission displays.

Cathode ray tubes are typical of luminescent displays employing electrons as the excitation means for the phosphors. Such displays have a display screen including an anode panel coated with phosphors that are selectively excited by electrons directed toward the phosphors from an adjacent electron-supplying cathode. The excited phosphors emit light, thereby creating a desired image visible to the viewer on the display screen. Phosphors having utility for display applications typically comprise a host lattice impregnated with a quantity of a dopant that activates luminescent properties in the resulting composition. The phosphors are conventionally manufactured by selecting the host lattice and dopant from preselected materials, mixing the materials, heating the mixed materials in the presence of a flux to effectuate infiltration of the dopant into the host lattice, and washing the fired material to remove the flux and obtain the desired phosphor for use in a host lighting or display fixture.

Many host lighting and display fixtures have performance requirements related to their particular area of application that define a need for specialized phosphors possessing performance characteristics satisfying these performance requirements. For example, in radar applications, it is desirable that pixels of transient luminescence visually persist on the radar display screen for many seconds after initial appearance thereof. Consequently, radar applications require phosphors having the specific performance characteristic of a slow rate of luminescent decay producing a relatively long afterglow. Although phosphors exhibiting a long afterglow are presently known, such phosphors typically have a short lifetime, diminishing their utility. By way of further example, it is desirable in certain other applications to operate the displays at a very low voltage, while providing a relatively bright display for clear visibility even in daylight. Such applications require phosphors having the specific performance characteristic of bright luminescence upon low-voltage excitation. In sum, it is apparent that an overall need exists for the manufacture of specialized phosphors capable of meeting the performance requirements of certain host lighting and display fixtures.

Accordingly, it is an object of the present invention to provide a process for manufacturing phosphor products satisfying predetermined performance requirements for specialized applications. More particularly, it is an object of the present invention to provide a process for manufacturing a phosphor product having long afterglow characteristics. It is another object of the present invention to provide a process for manufacturing a phosphor product having bright luminescent characteristics upon low-voltage excitation. It is a further object of the present invention to provide a phosphor product having long afterglow characteristics for specialized display applications such as radar screens. It is yet another object of the present invention to provide a phosphor product having bright luminescent characteristics upon low-voltage excitation for alternate specialized display applications. It is still another object of the present invention to provide a luminescent display device employing a phosphor product having bright luminescent characteristics upon low-voltage excitation. It is still a further object of the present invention to provide a luminescent display device employing a phosphor product having long afterglow characteristics. These objects and others are accomplished in accordance with the invention described hereafter.

SUMMARY OF THE INVENTION

The present invention is generally a process for manufacturing phosphor products having predetermined specialized performance characteristics. The invention further comprises the phosphor products resulting from this process and luminescent display devices utilizing the phosphor products resulting from this process. The process employs a specific multi-stage sequence of grinding and firing selected materials to obtain the phosphor products. In accordance with one embodiment of the invention, the present process creates phosphor products that luminesce bright red upon excitation. Such phosphor products are capable of bright red luminescence even when excited at very low-voltage excitation energies. In accordance with another embodiment of the invention, the present process creates phosphor products that luminesce with an extremely long afterglow upon excitation. Such phosphor products have specific utility for screen displays employed in radars and medical scanners including oscilloscopes, wherein persistence is a desired performance characteristic.

In each of its embodiments, the process of the present invention comprises selection of phosphor starting materials to include precursors of a dopant and precursors of a host lattice, all in solid particulate form. The grinding and firing sequence is initiated thereafter by combining the selected dopant precursor particles and the selected host lattice precursor particles in a suitable milling container and grinding the selected particles in an initial grinding stage for a relatively long initial grinding time period to achieve thorough mixing of the selected particles as well as a uniform particle size distribution and a relatively small average particle size thereof. The initial ground material resulting therefrom is removed to a suitable firing container and fired therein in an initial firing stage at a relatively low initial firing temperature for an initial firing time period. The initial fired material resulting therefrom is cooled, removed from the firing container, and replaced in the milling container.

The initial fired material is reground in an intermediate grinding stage for an intermediate grinding time period relatively shorter than the initial grinding time to resize the initial fired material. The intermediate ground material is replaced in the firing container and retired in an intermediate firing stage at a relatively high intermediate firing temperature for an intermediate firing time corresponding to the initial firing time. The intermediate fired material resulting therefrom is again cooled, removed from the firing container, and replaced in the milling container. The intermediate fired material is reground in a final grinding stage for a final grinding time period corresponding to the intermediate grinding time period to resize the material. The material of the intermediate grinding stage is replaced in the firing container and retired in a final firing stage at a final firing temperature for a relatively short final firing time under a reducing atmosphere. The desired phosphor product is achieved upon cooling of the final fired material.

The above-described embodiments of the invention are separately performed by varying the specific selection of the phosphor starting materials and, in particular, by varying the specific selection of the dopant and host lattice precursors. The present invention will be further understood from the drawings and the following detailed description.

BRIEF DESCRIPTION OF THE DRAWINGS

The Figure is a conceptual representation of a luminescent display device of the present invention.

DESCRIPTION OF PREFERRED EMBODIMENTS

The present invention relates to a process for manufacturing phosphor products having specialized performance characteristics. In accordance with a first embodiment, the present manufacturing process is initiated by selecting the phosphor starting materials. The phosphor starting materials include a precursor of a dopant and a precursor of a host lattice. The precursor of the dopant is a europium compound preferably in solid particulate form. The europium compound is selected from the group consisting of $Eu_2O_3$, $EuCl_3$, europium acetate, europium oxalate, $Eu(NO_3)_3$, $Eu(CO_3)_3$, $EuF_3$, $EuBr_3$, $Eu(SO_4)_3$, and mixtures thereof. The above-recited dopant precursors are capable of providing europium as the dopant (alternately termed an activator) in the resulting phosphor product.

The precursor of the host lattice is preferably a mixture of a first component selected from the group consisting of $Y_2O_3$, $Ga_2O_3$, $Al_2O_3$, $La_2O_3$, $Sc_2O_3$, $Gd_2O_3$, $Lu_2O_3$, and mixtures thereof and a second component which is ZnO. The first and second components of the host lattice precursor are provided in a solid particulate form and in a molar ratio of 1:1. The above-recited host lattice precursors are capable of providing one or more of the following binary host lattices when processed in the manner described hereafter: $ZnY_2O_4$, $ZnGa_2O_4$, $ZnAl_2O_4$, $ZnLa_2O_4$, $ZnSc_2O_4$, $ZnGd_2O_4$, and $ZnLu_2O_4$.

Upon selection of the precursors of the dopant and the host lattice in accordance with the above-recited criteria, the starting materials are placed together in a processing vessel substantially free of any other active species or substantially free of any contaminant-generating species to grind the particles in an initial grinding stage for a relatively long initial grinding time period. Thus, for example, the starting materials are substantially free of compositions, such as fluxes or antioxidants, that are conventionally employed to facilitate heat treatment of the phosphor starting materials. Fluxes are generally defined herein as compositions having a relatively low melting point, typically about 1000° C. or less, that promote infiltration of the dopant into the lattice structure when heated. Conventional fluxes known to the skilled artisan include ammonium compounds, such as ammonium chloride, and compounds combining Group I A or II A elements and Group VI A or VII A elements, such as alkali metal halides and alkaline earth metal halides. Conventional antioxidants facilitating heat treatment of the lattice and dopant mixture include sulfur.

The dopant precursor particles and the host lattice precursor particles are added to the processing vessel in relative amounts such that the dopant concentration of the final phosphor product is typically from about 1.0% to about 20.0% by weight, and preferably from about 5.0% to about 15.0% by weight, with the remaining weight percentage of the final phosphor product being the host lattice.

The preferred processing vessel of the initial grinding stage is a particle size reduction vessel, and more particularly a milling vessel utilized in a mill such as a McCrone mill, a Fritsch planetary mill, or a conventional ball mill. Most preferred among these mills are reciprocating mills, such as the McCrone mill. If a McCrone mill is employed, the initial grinding time period is typically no more than about 4 hours. If a conventional ball mill is employed, the initial grinding time period is typically longer, being at least about 6 hours, preferably at least about 12 hours, and more preferably at least about 24 hours. In any case, at the end of the initial grinding time period, complete mixing is achieved between the dopant precursor particles and the host lattice precursor particles, thereby obtaining a reduced uniform particle size distribution of the mixture.

Although, as noted above, the starting materials are maintained substantially free of any other active species and free of any contaminant-generating species during this step, an inert, non-contaminating liquid medium is often combined with the starting materials to form a slurry within the milling vessel, thereby enhancing the effectiveness of the initial grinding stage. If a liquid medium is employed in the initial grinding stage, the material resulting therefrom is separated from the liquid medium upon completion of the initial grinding stage and thoroughly dried to drive substantially all of the liquid medium from the particulate material. The average particle size of the material resulting from the initial grinding stage is preferably less than about 2 microns, and more preferably less than about 1 micron.

The dried initial ground material resulting from the initial grinding stage is removed from the milling vessel to a suitable firing container for heat treatment in an initial firing stage, thereby at least initiating formation of the host lattice from the precursor thereof and impregnation of the dopant within the resulting host lattice structure. The high purity of the eventual phosphor product is preserved in the initial firing stage by heat treating the initial ground material in the absence of any fluxes or other agents that are capable of introducing contaminants into the initial ground material. Accordingly, the composition being heat treated in the initial firing stage is essentially limited to the initial ground material containing the dopant and the precursor of the host lattice and is substantially free of any contaminants that could impair operation of the cathode when the phosphor product is employed in a luminescent display. The high purity of the phosphor product is further insured by employing a relatively pure, substantially impervious, nonporous crucible as the firing container for the material during heat treatment thereof such that process equipment contacting the heated material does not introduce any contaminants therein. Crucibles satisfying these criteria are formed, for example, from platinum or iridium, of which platinum is preferred.

The initial firing stage is performed by placing the firing container and its contents in a conventional heating means such as an oven or a kiln and firing them at a relatively low initial firing temperature for an initial firing time period. The initial firing temperature is between about 400° C. and about 800° C., preferably between about 500° C. and about 700° C., and more preferably about 600° C. The initial firing time period within the above-prescribed initial temperature range is between about 0.5 and about 2.0 hours, preferably between about 0.5 and about 1.5 hours, and or more preferably about 1 hour. The initial atmosphere during the initial firing stage is preferably air. Sulfur-containing atmospheres are preferably avoided, as exposure to sulfur-containing gases may be detrimental to the resulting phosphor product. Under these conditions, the initial fired material resulting from the initial firing stage does not exhibit substantial particle size growth due to the relatively low temperature and the absence of a flux.

After completion of the initial firing stage, the initial fired material is cooled, removed from the firing container, replaced in the milling container of the initial grinding stage, and reground therein in an intermediate grinding stage. The intermediate grinding stage is performed in substantially the same manner as the initial grinding stage except that the intermediate grinding time period is shorter relative to the initial grinding time period. Accordingly, the intermediate grinding time period for a McCrone mill is typically no more than about 2 hours, while the intermediate grinding time period for a conventional ball mill is typically longer, being up to about 4 hours. The intermediate grinding stage downsizes the initial fired material, thereby compensating for any particle size growth that may have occurred during the initial firing stage.

The intermediate ground material resulting from the intermediate grinding stage is replaced in the firing container of the initial firing stage, reinserted into the heating means and refired in an intermediate firing stage. The intermediate firing stage is performed in substantially the same manner as the initial firing stage except that the intermediate firing temperature is higher relative to the initial firing temperature. Accordingly, the intermediate firing temperature is between about 1100° C. and about 1500° C., preferably between about 1200° C. and about 1400° C., and more preferably about 1300° C. The intermediate firing time period is within substantially the same range as that of the initial firing stage and the intermediate firing atmosphere is likewise substantially the same as that of the initial firing stage. It is noted that under these conditions, the intermediate fired material resulting from the intermediate firing stage does not exhibit substantial particle size growth.

The intermediate fired material is cooled, removed from the firing container, replaced in the milling container of the initial grinding stage, and reground therein in a final grinding stage. The final grinding stage is performed in substantially the same manner as the intermediate grinding stage, thereby downsizing the intermediate fired material to compensate for any particle size growth that may have occurred during the intermediate firing stage. The final ground material resulting from the final grinding stage is replaced in the firing container of the initial firing stage, reinserted into the heating means and refired in a final firing stage. The final firing stage is performed in a reducing atmosphere over a relatively short final firing time period of about 1.0 hour or less and preferably about 0.5 hours or less. The final firing temperature is between about 900° C. and about 1300° C., preferably between about 1000° C. and about 1200° C., and more preferably about 1100° C. The reducing atmosphere of the final firing stage is preferably carbon monoxide, hydrogen, or nitrogen. The final firing stage depletes some of the oxygen from the host lattice structure and thoroughly impregnates the dopant within the host lattice to produce the desired high-purity phosphor product. Thus, upon cooling the final fired material resulting from the final firing stage, the desired phosphor product is obtained in the form of $ZnY_2O_4$:Eu, $ZnGa_2O_4$:Eu, $ZnAl_2O_4$:Eu, $ZnLa_2O_4$:Eu, $ZnSc_2O_4$:Eu, $ZnGd_2O_4$:Eu, $ZnLu_2O_4$:Eu, or a mixture thereof depending on the selected starting materials.

The phosphor products produced in accordance with the process of the above-described embodiment have the specific performance characteristic of luminescing bright red upon excitation, even when excited at very low-voltage excitation energies. Accordingly, the phosphor products produced herein have general utility in lighting and display applications, insofar as the present phosphor products are substituted for known red-luminescing phosphors in conventional lighting and display fixtures in a manner apparent to the skilled artisan. For example, the phosphor products produced herein are capable of outperforming conventional red-luminescing phosphors with respect to brightness, longevity and power requirements when employed as a screen coating in luminescent display applications such as field emission displays or cathode ray tubes.

A second embodiment of the invention is also a process for manufacturing phosphor products having specialized performance characteristics. The second embodiment is practiced in substantially the same manner as the above-described first embodiment, however, the criteria for selecting the phosphor starting materials are modified to produce a phosphor product having the specific performance characteristic of luminescing with an extremely long afterglow upon excitation. The phosphor starting materials include a precursor of a dopant and a precursor of a host lattice. The dopant precursor is a europium compound preferably in a solid particulate form. The europium compound is selected from the group consisting of $Eu_2O_3$, $EuCl_3$, europium acetate, europium oxalate, $Eu(NO_3)_3$, $Eu(CO_3)_3$, $EuF_3$, $EuBr_3$, $Eu(SO_4)_3$, and mixtures thereof. The above-recited dopant precursors are capable of providing europium as the dopant in the resulting phosphor product.

The precursor of the host lattice is preferably a mixture of a first component selected from the group consisting of $Ga_2O_3$, $Al_2O_3$, $Al_2(C_2H_3O_2)_3$, $Al(OC_2H_5)_3$, $In_2O_3$, $In(C_2H_3O_2)_3$, $In(C_5H_7O_2)_3$, and mixtures thereof and a second component selected from the group consisting of ZnO, $Zn(C_2H_3O_2)_2$, $Zn(C_5H_7O_2)_2$, $ZnCO_3$, CdO, $Cd(C_2H_3O_2)_2$, $CdCO_3$, $Cd(OOCH)_2$, MgO, $Mg(C_2H_3O_2)_2$, $Mg(C_5H_7O_2)_2$, $MgCO_3$, and mixtures thereof. The first and second components of the host lattice precursor are provided in a solid particulate form and in a molar ratio of 1:1. The above-recited host lattice precursors are capable of producing one or more of the following binary host lattices when processed in the manner described hereafter: $ZnGa_2O_4$, $ZnAl_2O_4$, $ZnIn_2O_4$, $CdGa_2O_4$, $CdAl_2O_4$, $CdIn_2O_4$, $MgGa_2O_4$, $MgAl_2O_4$, and $MgIn_2O_4$.

Upon selection of the precursors of the dopant and the host lattice in accordance with the above-recited criteria, the starting materials are combined in a processing vessel as described above in the absence of any other active species or any contaminant-generating species. The dopant precursor particles and the host lattice precursor particles are added to the processing vessel in relative amounts such that the dopant concentration of the final phosphor product is typically from about 0.01% to about 1.0% by weight, and preferably from 0.1% to about 1.0% about by weight, with the remaining weight percentage of the final phosphor product being the host lattice. The starting materials are processed in accordance with substantially the same grinding and firing sequence as recited above with respect to the first embodiment to obtain a desired high-purity phosphor product in the form of $ZnGa_2O_4$:Eu, $ZnAl_2O_4$:Eu, $ZnIn_2O_4$:Eu, $CdGa_2O_4$:Eu, $CdAl_2O_4$:Eu, $CdIn_2O_4$:Eu, $MgGa_2O_4$:Eu, $MgAl_2O_4$:Eu, $MgGa_2O_4$:Eu or mixtures thereof depending on the selected starting materials. The above-listed phosphor products produced by the process of the present invention are characterized as having a long afterglow upon excitation. Accordingly, such phosphor products have utility in applications, wherein persistence is a desired performance characteristic, insofar as the present phosphor products are used in replacement of conventional long-afterglow phosphors in a manner apparent to the skilled artisan. For example, the phosphor products produced herein are capable of outperforming conventional long-afterglow phosphor products with respect to longevity when employed as a screen coating in luminescent screen display applications such as radars and medical scanners including oscilloscopes.

With reference to the Figure, a luminescent display device of the present invention is shown and designated 10. The luminescent display device 10 generally comprises a display screen 12 and an energy source 14. The display screen 12 and energy source 14 are spaced a distance apart and aligned with each other so that the energy source 14 can direct excitation energy, such as in the form of electrons, onto the display screen 12. Energy sources having utility herein include electron emitters as are well known to the skilled artisan, for example, emitter tips for field emission displays and cathode ray emitters for cathode ray tube displays. The display screen 12 has a laminate construction comprising multiple layers including a substrate layer 16, an anode layer 18, and a phosphor product layer 20. The substrate layer 16 is a continuous sheet of a transparent, high-strength material such as glass. The substrate layer 16 supports the unconsolidated anode and phosphor product layers 18, 20 which are sequentially coated onto the face of the substrate layer 16. The anode layer 18 is made up of transparent conducting electrodes well known in the art such as indium tin oxide (ITO) that serve as an anode for the energy source 14. The phosphor product layer 20 consists essentially of any of the above-recited phosphor products.

During operation of the device 10, excitation energy 22 is selectively transmitted from the energy source 14 to the anode layer 18 of the display screen 12. The excitation energy 22 travels to the phosphor product layer 20 along its path to the anode layer 18, exciting the phosphor product layer 20 and causing it to luminesce. Light produced by luminescence of the phosphor product layer is visible to the viewer through the transparent substrate and anode layers 18, 16 to achieve a desired visual effect.

The following examples demonstrate the practice and utility of the present invention, but are not to be construed as limiting the scope thereof.

EXAMPLE 1

A dopant precursor consisting of $Eu_2O_3$ in solid particulate form is combined in a McCrone mill jar with a host lattice precursor consisting of a mixture of $Y_2O_3$ and ZnO, also in solid particulate form. The molar ratio of $Y_2O_3$ to ZnO is 1:1 and the weight concentration of $Eu_2O_3$ is 5%. The precursor particles are milled in a McCrone mill in an initial grinding stage for a period of 4 hours to achieve complete mixing between the dopant precursor and host lattice precursor particles. The average particle size of the material resulting from the initial grinding stage is less than about 1 micron. The resulting initial ground material is placed in a platinum crucible and heated in oven an initial firing stage to a temperature of 600° C. for 1 hour. The atmosphere of the initial firing stage is substantially sulfur-free air. The initial fired material is cooled, removed from the crucible, replaced in the McCrone mill jar, and reground therein in an intermediate grinding stage for a period of 2 hours. The resulting intermediate ground material is replaced in the crucible, reinserted into the oven and heated at a temperature of 1300° C. for 1 hour in air. The intermediate fired material is cooled, removed from the crucible, replaced in the McCrone mill jar, and reground therein in a final grinding stage for a period of 2 hours. The resulting final ground material is replaced in the crucible, reinserted into the oven and heated at a temperature of 1100° C. for 0.5 hour in a reducing atmosphere of carbon monoxide. The final fired material is cooled to produce the phosphor product $ZnY_2O_4$:Eu. Upon low voltage excitation of the phosphor product, the phosphor product luminesces bright red.

EXAMPLE 2

A dopant precursor consisting of $Eu_2O_3$ in solid particulate form is combined in a McCrone mill jar with a host lattice precursor consisting of a mixture of $Ga_2O_3$ and ZnO, also in solid particulate form. The molar ratio of $Ga_2O_3$ to ZnO is 1:1 and the weight concentration of $Eu_2O_3$ is 0.1%. The precursor particles are milled and fired in substantially the same multi-stage sequence as Example 1 to produce the phosphor product $ZnGa_2O_4$:Eu. Upon excitation of the phosphor product, the product luminesces with a long afterglow.

While forgoing preferred embodiments of the invention have been described and shown, it is understood that alternatives and modifications, such as those suggested and others, may be made thereto and fall within the scope of the invention.

We claim:

1. A process for preparing a phosphor product comprising:
    selecting phosphor starting materials comprising a precursor of a dopant and a precursor of a host lattice;
    grinding said phosphor starting materials in an initial grinding stage for an initial grinding time period to produce an initial ground material having a smaller particle size distribution than said starting material;
    firing said initial ground material in an initial firing stage at an initial firing temperature for an initial firing time period to produce an initial fired material;
    grinding said initial fired material in an intermediate grinding stage for an intermediate grinding time period to produce an intermediate ground material having a smaller particle size than said initial fired material, wherein said intermediate grinding time period is substantially less than said initial grinding time period;
    firing said intermediate ground material in an intermediate firing stage at an intermediate firing temperature for an intermediate firing time to produce an intermediate fired material, wherein said intermediate firing temperature is substantially greater than said initial firing temperature;
    grinding said intermediate fired material in a final grinding stage for a final grinding time period to produce a final ground material having a smaller particle size than said intermediate fired material; and firing said final ground material in a final firing stage at a final firing temperature for a final firing time to produce a phosphor product, wherein said final firing time is substantially less than said intermediate firing time.

2. A process as recited in claim 1 wherein said final firing stage is performed in a reducing atmosphere.

3. A process as recited in claim 1 wherein said precursor of said dopant is selected from a group consisting of $Eu_2O_3$, $EuCl_3$, europium acetate, europium oxalate, $Eu(NO_3)_3$, $Eu(CO_3)_3$, $EuF_3$, $EuBr_3$, $Eu(SO_4)_3$, and mixtures thereof.

4. A process as recited in claim 1 wherein said precursor of said host lattice is a mixture of a first component selected from the group consisting of $Ga_2O_3$, $Al_2O_3$, $Al_2(C_2H_3O_2)_3$, $Al(OC_2H_5)_3$, $In_2O_3$, $In(C_2H_3O_2)_3$, $In(C_5H_7O_2)_3$, and mixtures thereof and a second component selected from the group consisting of ZnO, $Zn(C_2H_3O_2)_2$, $Zn(C_5H_7O_2)_2$, $ZnCO_3$, CdO, $Cd(C_2H_3O_2)_2$, $CdCO_3$, $Cd(OOCH)_2$, MgO, $Mg(C_2H_3O_2)_2$, $Mg(C_5H_7O_2)_2$, $MgCO_3$, and mixtures thereof.

5. A process as recited in claim 4 wherein said first component is $Ga_2O_3$ and said second component is ZnO.

6. A process as recited in claim 1 wherein said precursor of said host lattice is a mixture of a first component selected from the group consisting of $Y_2O_3$, $Ga_2O_3$, $Al_2O_3$, $La_2O_3$, $Sc_2O_3$, $Gd_2O_3$, $Lu_2O_3$, and mixtures thereof and a second component consisting of ZnO.

7. A process as recited in claim 6 wherein said first component is $Y_2O_3$.

8. A process as recited in claim 1 wherein said phosphor product is selected from the group consisting of $ZnY_2O_4$:Eu, $ZnGa_2O_4$:Eu, $ZnAl_2O_4$:Eu, $ZnLa_2O_4$:Eu, $ZnSc_2O_4$:Eu, $ZnGd_2O_4$:Eu, $ZnLu_2O_4$:Eu, and mixtures thereof.

9. A process as recited in claim 8 wherein said dopant has a concentration in said phosphor product between about 1 and about 20 weight percent and the remainder of said phosphor product is said host lattice.

10. A process as recited in claim 1 wherein said phosphor product is $ZnY_2O_4$:Eu.

11. A process as recited in claim 1 wherein said phosphor product is selected from the group consisting of $ZnGa_2O_4$:Eu, $ZnAl_2O_4$:Eu, $ZnIn_2O_4$:Eu, $CdGa_2O_4$:Eu, $CdAl_2O_4$:Eu, $CdIn_2O_4$:Eu, $MgGa_2O_4$:Eu, $MgAl_2O_4$:Eu, $MgGa_2O_4$:Eu, and mixtures thereof.

12. A process as recited in claim 11 wherein said dopant has a concentration in said phosphor product between about 0.01 and about 1 weight percent and the remainder of said phosphor product is said host lattice.

13. A process as recited in claim 1 wherein said phosphor product is $ZnGa_2O_4$:Eu.

14. A process as recited in claim 1 wherein said initial firing time period is between about 0.5 and about 2.0 hours.

15. A process as recited in claim 1 wherein said initial firing temperature is between about 400° C. and about 800° C.

16. A process as recited in claim 1 wherein said intermediate firing time period is between about 0.5 and about 2.0 hours.

17. A process as recited in claim 1 wherein said intermediate firing temperature is between about 1100° C. and about 1500° C.

18. A process as recited in claim 1 wherein said final firing time period is about 1.0 hour or less.

19. A phosphor product produced by a process comprising:

selecting phosphor starting materials comprising a precursor of a dopant and a precursor of a host lattice, wherein said precursor of said dopant is selected from a group consisting of $Eu_2O_3$, $EuCl_3$, europium acetate, europium oxalate, $Eu(NO_3)_3$, $Eu(CO_3)_3$, $EuF_3$, $EuBr_3$, $Eu(SO_4)_3$, and mixtures thereof and said precursor of said host lattice is a mixture of a first component selected from the group consisting of $Ga_2O_3$, $Al_2O_3$, $Al_2(C_2H_3O_2)_3$, $Al(OC_2H_5)_3$, $In_2O_3$, $In(C_2H_3O_2)_3$, $In(C_5H_7O_2)_3$, and mixtures thereof and a second component selected from the group consisting of ZnO, $Zn(C_2H_3O_2)_2$, $Zn(C_5H_7O_2)_2$, $ZnCO_3$, CdO, $Cd(C_2H_3O_2)_2$, $CdCO_3$, $Cd(OOCH)_2$, MgO, $Mg(C_2H_3O_2)_2$, $Mg(C_5H_7O_2)_2$, $MgCO_3$, and mixtures thereof;

grinding said phosphor starting materials in an initial grinding stage for an initial grinding time period to produce an initial ground material;

firing said initial ground material in an initial firing stage at an initial firing temperature for an initial firing time period to produce an initial fired material;

grinding said initial fired material in an intermediate grinding stage for an intermediate grinding time period to produce an intermediate ground material;

firing said intermediate ground material in an intermediate firing stage at an intermediate firing temperature for an intermediate firing time to produce an intermediate fired material, wherein said intermediate firing temperature is substantially greater than said initial firing temperature;

grinding said intermediate fired material in a final grinding stage for a final grinding time period to produce a final ground material; and firing said final ground material in a final firing stage at a final firing temperature for a final firing time to produce a phosphor product, wherein said final firing time is substantially less than said intermediate firing time.

20. A phosphor product produced by a process as recited in claim 19 wherein said initial firing time period is between about 0.5 and about 2.0 hours.

21. A phosphor product produced by a process as recited in claim 19 wherein said initial firing temperature is between about 400° C. and about 800° C.

22. A phosphor product produced by a process as recited in claim 20 wherein said intermediate firing time period is between about 0.5 and about 2.0 hours.

23. A phosphor product produced by a process as recited in claim 19 wherein said intermediate firing temperature is between about 1100° C. and about 1500° C.

24. A phosphor product produced by a process as recited in claim 19 wherein said final firing time period is about 1.0 hour or less.

25. A phosphor product produced by a process comprising:

selecting phosphor starting materials comprising a precursor of a dopant and a precursor of a host lattice, wherein said precursor of said dopant is selected from a group consisting of $Eu_2O_3$, $EuCl_3$, europium acetate, europium oxalate, $Eu(NO_3)_3$, $Eu(CO_3)_3$, $EuF_3$, $EuBr_3$, $Eu(SO_4)_3$, and mixtures thereof and said precursor of said host lattice is a mixture of a first component selected from the group consisting of $Y_2O_3$, $Ga_2O_3$, $Al_2O_3$, $La_2O_3$, $Sc_2O_3$, $Gd_2O_3$, $Lu_2O_3$, and mixtures thereof and a second component consisting of ZnO;

grinding said phosphor starting materials in an initial grinding stage for an initial grinding time period to produce an initial ground material;

firing said initial ground material in an initial firing stage at an initial firing temperature for an initial firing time period to produce an initial fired material;

grinding said initial fired material in an intermediate grinding stage for an intermediate grinding time period to produce an intermediate ground material;

firing said intermediate ground material in an intermediate firing stage at an intermediate firing temperature for an intermediate firing time to produce an intermediate fired material, wherein said intermediate firing temperature is substantially greater than said initial firing temperature;

grinding said intermediate fired material in a final grinding stage for a final grinding time period to produce a final ground material; and firing said final ground material in a final firing stage at a final firing temperature for a final firing time to produce a phosphor product, wherein said final firing time is substantially less than said intermediate firing time.

26. A phosphor product produced by a process as recited in claim 25 wherein said initial firing time period is between about 0.5 and about 2.0 hours.

27. A phosphor product produced by a process as recited in claim 25 wherein said initial firing temperature is between about 400° C. and about 800° C.

28. A phosphor product produced by a process as recited in claim 25 wherein said intermediate firing time period is between about 0.5 and about 2.0 hours.

29. A phosphor product produced by a process as recited in claim 25 wherein said intermediate firing temperature is between about 1100° C. and about 1500° C.

30. A phosphor product produced by a process as recited in claim 25 wherein said final firing time period is about 1.0 hour or less.

31. A luminescent display device comprising:

an energy source; and a display screen aligned a distance from said energy source, said display screen having a plurality of layers including a substrate layer supporting an electrode layer and a phosphor product layer, wherein said phosphor product layer contains a phosphor product selected from the group consisting of $ZnY_2O_4$:Eu, $ZnGa_2O_4$:Eu, $ZnAl_2O_4$:Eu, $ZnLa_2O_4$:Eu, $ZnSc_2O_4$:Eu, $ZnGd_2O_4$:Eu, $ZnLu_2O_4$:Eu, and mixtures thereof.

32. A device as recited in claim 31 wherein said phosphor product contains a europium dopant and a host lattice, said dopant having a concentration in said phosphor product between about 1 and about 20 weight percent and the remainder of said phosphor product being said host lattice.

33. A luminescent display device comprising:

an energy source; and a display screen aligned a distance from said energy source, said display screen having a plurality of layers including a substrate layer supporting an anode layer and a phosphor product layer, wherein said phosphor product layer contains a phosphor product selected from the group consisting of $ZnGa_2O_4$:Eu, $ZnAl_2O_4$:Eu, $ZnIn_2O_4$:Eu, $CdGa_2O_4$:Eu, $CdAl_2O_4$:Eu, $CdIn_2O_4$:Eu, $MgGa_2O_4$:Eu, $MgAl_2O_4$:Eu, $MgGa_2O_4$:Eu, and mixtures thereof.

34. A device as recited in claim 33 wherein said phosphor product contains a europium dopant and a host lattice, said dopant having a concentration in said phosphor product between about 0.01 and about 1 weight percent and the remainder of said phosphor product being said host lattice.

* * * * *